(12) United States Patent
Preising et al.

(10) Patent No.: US 8,935,955 B2
(45) Date of Patent: Jan. 20, 2015

(54) TEST STAND FOR THE DYNAMIC TESTING OF AN INDIVIDUAL RUNNING GEAR COMPONENT OR OF A COMPLETE AXLE SYSTEM OF A MOTOR VEHICLE, AND ALSO A METHOD FOR TESTING UPON SAID TEST STAND

(75) Inventors: Eric Preising, Tiefenbronn (DE);
 Guenter Poetsch, Muehlacker (DE);
 Oliver Schadl, Sindelfingen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 212 days.

(21) Appl. No.: 13/605,284

(22) Filed: Sep. 6, 2012

(65) Prior Publication Data
US 2013/0055804 A1    Mar. 7, 2013

(30) Foreign Application Priority Data

Sep. 7, 2011    (DE) .......................... 10 2011 053 325

(51) Int. Cl.
 *G01M 17/04*    (2006.01)
 *G01M 13/02*    (2006.01)
(52) U.S. Cl.
 CPC ............ *G01M 17/04* (2013.01); *G01M 13/027* (2013.01); *G01M 13/021* (2013.01)
 USPC ....................................................... 73/117.03
(58) Field of Classification Search
 CPC ......................... G01M 17/0078; G01M 17/04
 USPC ............... 73/116.01, 116.05, 116.06, 117.01, 73/117.02, 117.03
 See application file for complete search history.

(56) References Cited

U.S. PATENT DOCUMENTS

| 4,103,532 | A | 8/1978 | Buzzi |
| 5,241,856 | A | 9/1993 | Petersen et al. |

FOREIGN PATENT DOCUMENTS

| DE | 27 23 527 A1 | 12/1977 |
| JP | 4 264 226 A | 9/1992 |

OTHER PUBLICATIONS

German Patent Office, German Search Report in German Patent Application No. 10 2011 053 325.7 (Apr. 4, 2012).

*Primary Examiner* — Eric S McCall
(74) *Attorney, Agent, or Firm* — Leydig, Voit & Mayer, Ltd.

(57) ABSTRACT

A test stand for dynamic testing of an individual running gear component or of a complete axle system of a motor vehicle includes a test stand frame having. The test stand frame has a mounting area configured for mounting the complete axle system in the mounting area in a first installation direction. A fastening device is configured for fixed mounting of the individual running gear component on the fastening device in a second installation direction, the second installation direction being different from the first installation direction. An actuator is configured for dynamic excitation of both of the complete axle system and the individual running gear component. The actuator is configured to connect to the individual running gear component or the complete axle system in a region of a point of intersection of the first installation direction and the second installation direction.

14 Claims, 5 Drawing Sheets

TEST STAND FOR THE DYNAMIC TESTING OF AN INDIVIDUAL RUNNING GEAR COMPONENT OR OF A COMPLETE AXLE SYSTEM OF A MOTOR VEHICLE, AND ALSO A METHOD FOR TESTING UPON SAID TEST STAND

CROSS-REFERENCE TO RELATED APPLICATIONS

This application claims priority to German Patent Application No. DE 10 2011 053 325.7, filed Sep. 7, 2011, which is hereby incorporated by reference herein in its entirety.

FIELD

The present invention relates to a test stand for the dynamic testing of an individual running gear component or of a complete axle system of a motor vehicle, and also relates to a method for testing upon said test stand.

BACKGROUND

For the development of running gears with regard to the desired dynamic behavior of the vehicle and also with regard to the assessment of the comfort situation for the occupants of the vehicle, the most accurate knowledge possible of the interaction of the individual components of the running gear, and in this case especially of the spring strut, with the remaining components of the running gear, and also the recording of the forces and vibrations which are introduced onto the frame from the running gear in the process, are of particular importance. Checking these values in a test stand is arranged against the backdrop of the restricted accessibility of the running gear components, of the limited clearance for the associated measurement techniques and also of the measuring which is possible, but difficult, only at a very late time point of the development of the vehicle.

Therefore, on the one hand it is necessary to measure dynamic spring strut characteristic values in an objective and reproducible manner, under conditions which are as close to reality as possible. On the other hand, the spring strut which is installed in a sub-assembly or in the complete axle of the vehicle only allows information about the forces and vibrations which are transmitted from the running gear to the frame, which in turn depend significantly upon the elastokinematics of the spring strut in the installed state under load.

DE 601 33 799 T2 describes a test stand for testing running gear components, with the aid of which an analysis of the wheel movement characteristics (for example wheel camber, track width and wheel caster) in an independent wheel suspension system with regard to the influence of various installed positions and the length of connecting elements in a steering system and in a suspension system, and also the recording of the associated wheel kinematics of the excited wheel on the test stand, are possible.

Reference may additionally be made to printed publication WO 2007/133601 A2 which describes a test stand for a body, in which each wheel is individually seated on an associated post and is excited by this in the vertical direction, wherein provision is furthermore made for actuators for applying longitudinal and lateral forces to the body.

SUMMARY

In an embodiment, the present invention provides a test stand for dynamic testing of an individual running gear component or of a complete axle system of a motor vehicle includes a test stand frame having. The test stand frame has a mounting area configured for mounting the complete axle system in the mounting area in a first installation direction. A fastening device is configured for fixed mounting of the individual running gear component on the fastening device in a second installation direction, the second installation direction being different from the first installation direction. An actuator is configured for dynamic excitation of both of the complete axle system and the individual running gear component. The actuator is configured to connect to the individual running gear component or the complete axle system in a region of a point of intersection of the first installation direction and the second installation direction.

BRIEF DESCRIPTION OF THE DRAWINGS

Exemplary embodiments of the present invention are described in more detail below with reference to the drawings, in which.

DETAILED DESCRIPTION

Figure 1:
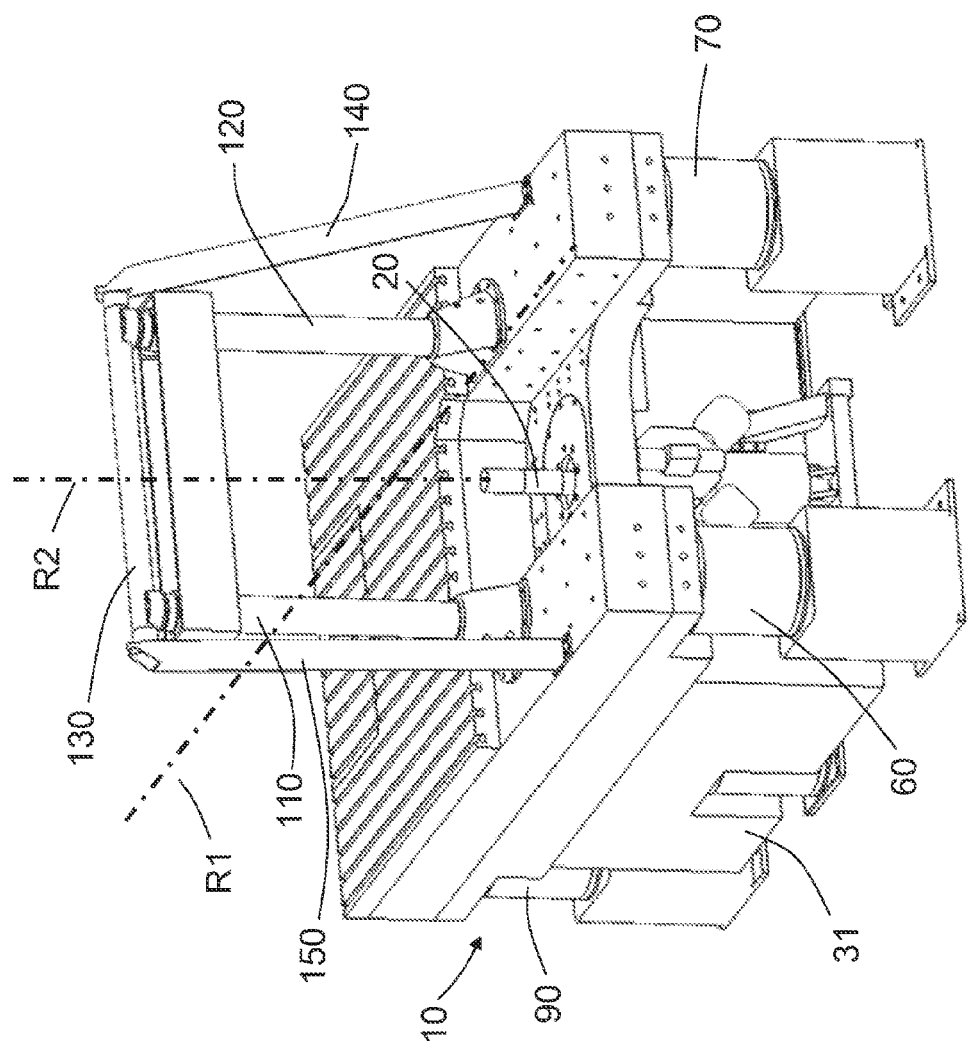
FIG. 1 shows a perspective view of the front side of a test stand according to an exemplary embodiment of the present invention.

In an embodiment, the present invention provides, an improved test stand for testing the dynamic behavior both of individual components of a running gear with any configuration and of a complete axle system of a running gear for a motor vehicle, which are excited in each case by means of just a single actuator system, and also to provide a method for the dynamic testing thereof on this test stand.

As a result of the different alignment of the individual running gear components and of the complete axle system in the installed state, a dynamic testing of these two on a single test stand is possible.

Therefore, the comfort characteristics of an individual running component and also the associated complete axle system can be tested in a simple and reproducible manner. Furthermore, with the aid of the present test stand individual running gear components of different manufacturers can be objectively compared with each other and their effect upon the complete axle system can be assessed. As a result, its, or their, previously described installation in a test stand can also be dispensed with, wherein within the scope of the dynamic testing on the test stand according to the invention the comfort characteristics can still be determined under conditions which are close to reality by the suitable selection of the dynamic excitations.

The installation direction of the individual running gear components is in most cases predetermined by its longitudinal direction but can also be different from this. The installation direction of the complete axle system corresponds in most cases to the longitudinal direction of the front axle or rear axle of the axle system but can also be different from this.

The actuator is then connected in each case to the component or to the complete axle system to be tested in the region of the point of intersection of these two installation directions. The two installation directions are preferably perpendicular to each other in each case, but can also be arranged at any angle in relation to each other.

The actuator, in the case of the individual running gear component, can be connected to a free end of the running gear component, and in the case of the complete axle system can be connected for example to the brake or to the brake disk or to a wheel, which is mounted on the brake, so that the component or the sub-assembly to be tested is dynamically excited by the actuator.

According to an embodiment, it is provided that the fastening device is arranged adjacent to the mounting area. As a result, a compact construction for the present test stand can be achieved.

According to an embodiment, it is provided that the fastening device is arranged essentially above the mounting area. This arrangement advantageously enables a perpendicular orientation of the respective installation directions of the components or sub-assemblies, which are to be tested, in relation to each other.

According to an embodiment, it is provided that the actuator is arranged adjacent to the mounting area and substantially below the fastening device. This arrangement enables a dynamic testing of the installed individual running gear component along its longitudinal direction with the aid of the actuator. In addition to this, this arrangement enables the dynamic testing of the complete axle system, wherein the actuator can then excite this in a particularly simple manner in the region of the brake or of an installed wheel.

According to an embodiment, it is provided that the actuator, at least in sections along its longitudinal direction, is completely encompassed by the test stand frame. This arrangement allows compact dimensioning of the test stand, in which the actuator can be arranged as close as possible to the mounting area.

According to an embodiment, it is provided that a pneumatic spring suspension is additionally provided for vibration damping of the test stand frame, wherein the natural frequency of the associated pneumatic springs of the pneumatic spring suspension can be switched between a first natural frequency and a second natural frequency. As a result, measurement results for the component or the sub-assembly to be tested are achieved with the greatest possible accuracy providing the test frequency of the component or sub-assembly lies within the range of the first or second natural frequency of the pneumatic springs, wherein the other natural frequency of the pneumatic springs of the pneumatic spring suspension is then adjusted in each case.

According to an embodiment, it is provided that the excitation both of the individual running gear component and of the complete axle system by means of the actuator is carried out substantially in the vertical direction. This allows a simple representation of the dynamic excitation of the component or of the sub-assembly, which can be simply recorded by a measurement technique in a test facility.

According to an embodiment, it is provided that the excitation both of the individual running gear component and of the complete axle system by means of the actuator has additional excitation components which lie in a plane which is parallel to the mounting area. As a result, additional excitation components for the dynamic testing of the component or of the sub-assembly to be tested can be realized with the aid of the actuator so that the excitation, which is close to reality, and consequently the accuracy of the measured comfort characteristics of the component or of the sub-assembly to be tested can be advantageously increased.

According to an embodiment, it is provided that the fastening device for the individual running gear component has a crosshead for the connecting of an end section of the individual running gear component. The crosshead is arranged in relation to the actuator in such a way that the individual running gear component is preferably excited by this in the longitudinal direction of the individual running gear component.

According to an embodiment, it is provided that the crosshead is height-adjustable in relation to the actuator. As a result, individual running gear components with different installation dimensions can be dynamically tested on the test stand in a simple manner. Furthermore, it is possible as a result to attach additional components to the individual running gear component for connecting to the body or to the running gear within the scope of the dynamic testing so that their influence upon the elastokinematics of the individual running gear component can be recorded and assessed.

According to an embodiment, it is provided that the natural frequency of the crosshead is higher than the highest test frequency of the test stand. This design ensures that during the dynamic testing of the individual running gear component the natural frequency of the crosshead cannot influence the recorded measured variables.

According to an embodiment, it is provided that the actuator is a servo-hydraulic pulses.

According to an embodiment, it is provided that the actuator for the dynamic testing of the individual running gear component or of the complete axle system generates an excitation frequency of 0.001 Hz to 100 Hz. This excitation spectrum especially advantageously enables a dynamic testing of the components or of the sub-assembly to be tested both at low excitation frequencies and in running situations which are characterized by particularly high dynamics, wherein both excitation scenarios can be realized on a single test stand, as a result of which the comparability of the determined measured values with regard to the assessment of the comfort characteristics can be ensured.

In an embodiment, the present invention provides a method for the dynamic testing of an individual running gear component or of a complete axle system on a test stand for the dynamic testing of an individual running gear component or of a complete axle system, which has a test stand frame, a fastening device and an actuator, with the following steps: mounting of the complete axle system, with the aid of the test stand frame, on a mounting area of said test stand frame, wherein the complete axle system is arranged in the mounting area in a first installation direction; alternatively, fixed mounting of the individual running gear component with the aid of the fastening device, wherein the individual running gear component is arranged on the fastening device in a second installation direction which is different from the first installation direction; dynamic exciting of the individual running gear component or of the complete axle system with the aid of the actuator, wherein the actuator is arranged in such a way that this is connected to the individual running gear component or to the complete axle system in the region of the point of intersection of the first installation direction with the second installation direction.

The method for dynamic testing can additionally comprise the steps of establishing a test frequency for the dynamic testing of the individual running gear component or of the complete axle system: establishing whether the test frequency is essentially identical to a first natural frequency of associated pneumatic springs of a pneumatic spring suspension of the test stand or to a second natural frequency of the associated pneumatic springs of the pneumatic spring suspension of the test stand; and establishing the second natural frequency for the associated pneumatic springs of the pneumatic spring suspension of the test stand if the test frequency is essentially identical to the first natural frequency of the associated pneumatic springs of the pneumatic spring suspension of the test stand; and establishing the first natural frequency for the associated pneumatic springs of the pneumatic spring suspension of the test stand if the test frequency is substantially identical to the second natural frequency of the associated pneumatic springs of the pneumatic spring suspension of the test stand.

In the figures, the same designations identify the same, or functionally the same, components, unless stated to the contrary.

Figure 2:
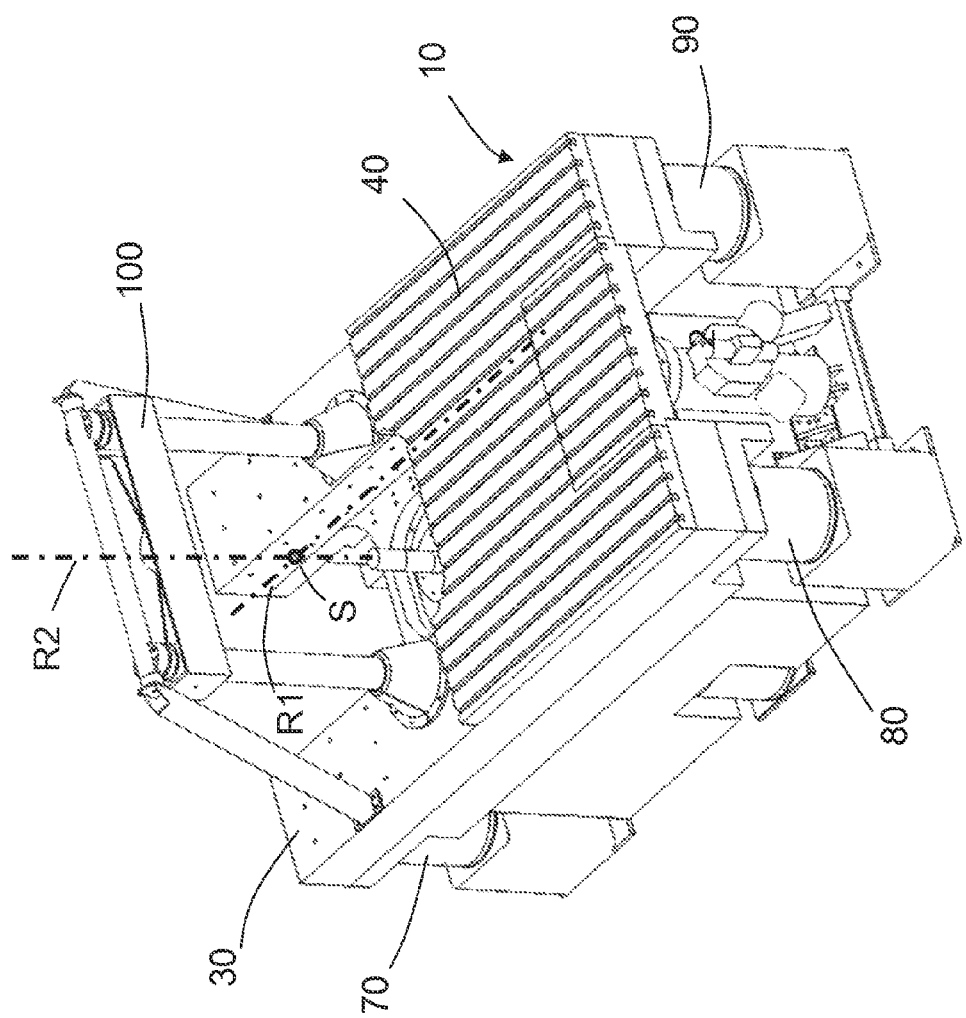
FIG. 2 shows a perspective view of the rear side of the test stand according to FIG. 1.

FIGS. 1 and 2 show a perspective view of the front side or of the rear side of a test stand according to an exemplary embodiment of the present invention. The test stand 10 has a test stand frame 30 which on its underside has a seismic mass 31 which serves for damping the vibration of the test stand frame 30, which vibration, by means of an actuator 20 during a dynamic testing of an individual running gear component or of a complete axle system, is introduced onto these. The seismic mass 31 is connected to the test stand frame 30 in a conventional manner. Arranged in each case in the region of the corners of the test stand frame 30 beneath said test stand frame are pneumatic springs 60, 70, 80, 90 which prevent a transfer of vibrations of the test stand frame 30 during the dynamic testing of the components or of the sub-assembly to be tested into the foundation of the construction site of the test stand 10.

The test stand frame 30 is an essentially plate-like component which has a recess in the region of its front side, through which the actuator 20 extends. The test stand frame 30, in the region of its rear side, has a mounting area 40 which is provided for the fastening of the complete axle system on the test stand frame 30. The mounting area 40 has a multiplicity of grooves which extend in the longitudinal direction of the test stand frame 30. Adjacent to the mounting area 40, in the region of the upper side of the test stand frame 30, the test stand 10 has a fastening device 50 which is provided for the fixed mounting of the individual running gear component. The fastening device 50 has a crosshead 100 which is guided at its longitudinal ends by a guide column 110, 120 in each case and as a result is displaceable along the longitudinal direction of the guide columns 110, 120. Furthermore, the crosshead 100 has a locking mechanism which serves for fixing the crosshead 100 in the longitudinal direction of the guide columns 110, 120. The guide columns 110, 120, in the region of their free longitudinal ends, are bridged by a cross member 130 which interconnects the two guide columns 110, 120. The longitudinal ends of the cross member 130 are connected in each case to a support strut 140, 150 which in turn are connected to the upper side of the test stand frame 30, wherein these are arranged in an inclined manner.

An actuator 20, which is preferably designed as a servo-hydraulic pulser, is arranged substantially beneath the fastening device 50 and in the region of the mounting area 40, wherein the longitudinal direction of the actuator 20 is substantially identical to a second installation direction R2 for the individual running gear component or is at least parallel to this. Furthermore, the complete axle system is fastened on the mounting area 40 in such a way that this is then arranged in a first installation direction R1, wherein the first installation direction R1 and the second installation direction R2 intersect at a point of intersection S. Consequently, the first installation direction R1 is different from the second installation direction R2. The actuator 20 is additionally arranged in the region of the recess of the test stand frame 30.

Figure 3:
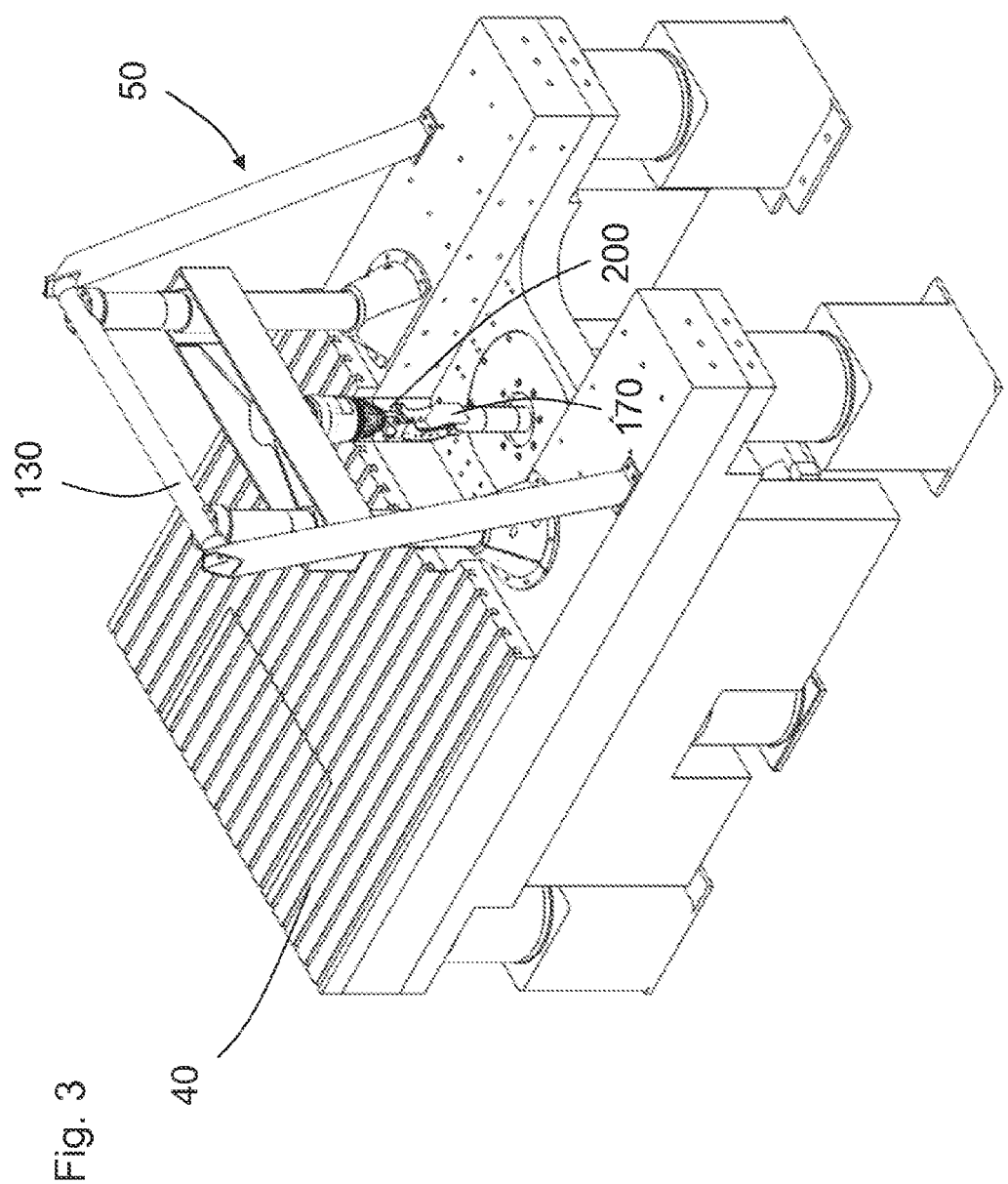
FIG. 3 shows a perspective view of the test stand according to FIG. 1 during the testing of an individual running gear component.

FIG. 3 shows a perspective view of the test stand according to FIG. 1 during the testing of an individual running gear component 200. The individual running gear component 200 is a spring strut, for example, which is to be tested with regard to its comfort characteristics within the scope of a dynamic test. The spring strut is arranged in the middle region of the crosshead 100 in this case, wherein one longitudinal end of the spring strut is connected in a fixed manner to the crosshead 100, whereas the other longitudinal end of the spring strut is connected to the actuator 20 with the aid of connecting element 170. The crosshead 100 is displaced in this case along the longitudinal direction of the guide columns 140, 150 and locked in this position so that the spring strut is located in its test position. The spring strut is preferably connected to the crosshead 100 in such a way that its longitudinal direction is parallel to the longitudinal direction of the actuator 20.

Figure 4:
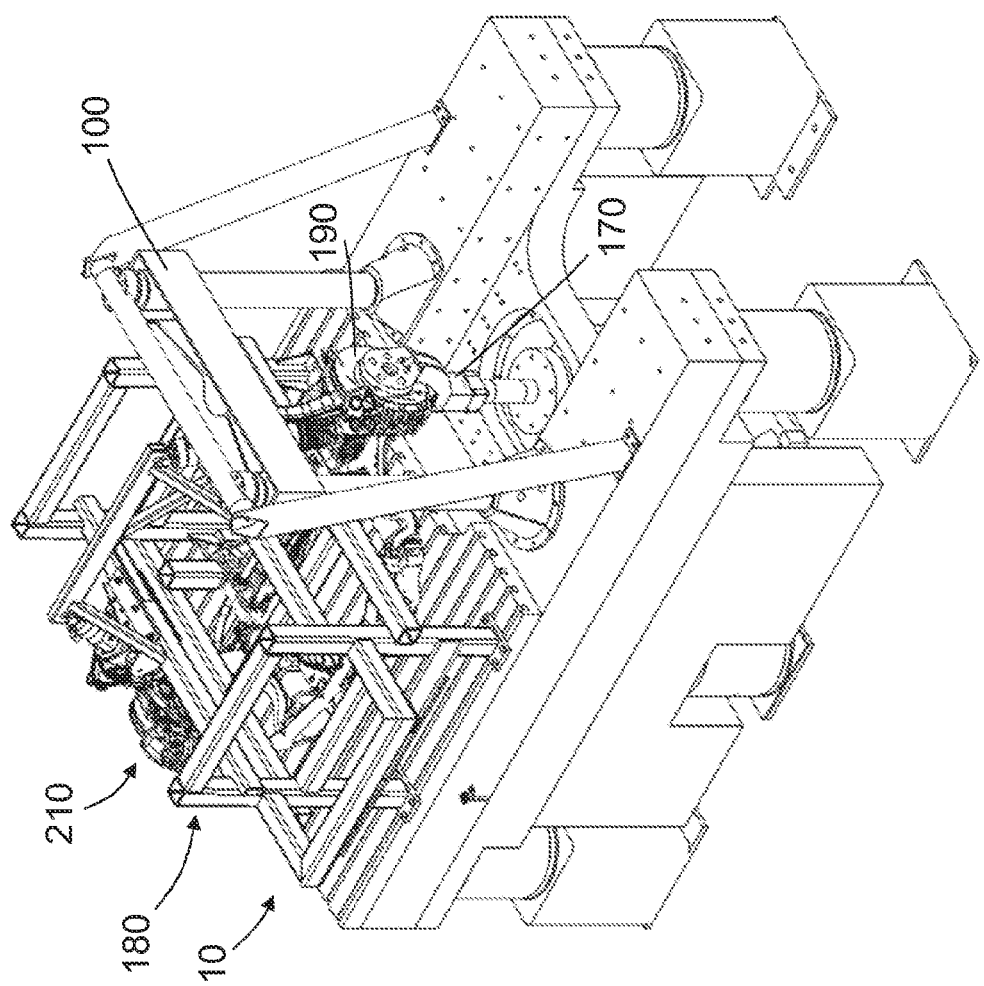
FIG. 4 shows a perspective view of the test stand according to FIG. 1 during the testing of a complete axle system.

FIG. 4 shows a perspective view of the test stand according to FIG. 1 during the testing of a complete axle system 210. The complete axle system 210 is connected in this case to the mounting area 40 of the test stand frame 30 via a clamping fixture 180. The clamping fixture 180 comprises a multiplicity of extruded profiles and in this case essentially forms the connecting points of the complete axle system 210 to the body of the vehicle so that the installation situation of the individual running gear components are realistically reproduced within the scope of the complete axle system 210.

The actuator 20, in the region of a longitudinal free end of the complete axle system 210, is connected thereto with the aid of an additional connecting element 170, wherein the free longitudinal end of the complete axle system 210 is formed here by a brake 190. The excitation of the complete axle system 210 by means of the actuator 20 is carried out in the vertical direction.

The crosshead 100 is displaced as far as the region of the cross member 130 during the dynamic testing of the complete axle system 210 so that the installation of the complete axle system 210 can be carried out in a convenient manner and at the same time a collision of the cross member 100 with the brake 190 during the dynamic testing is prevented.

Figure 5:
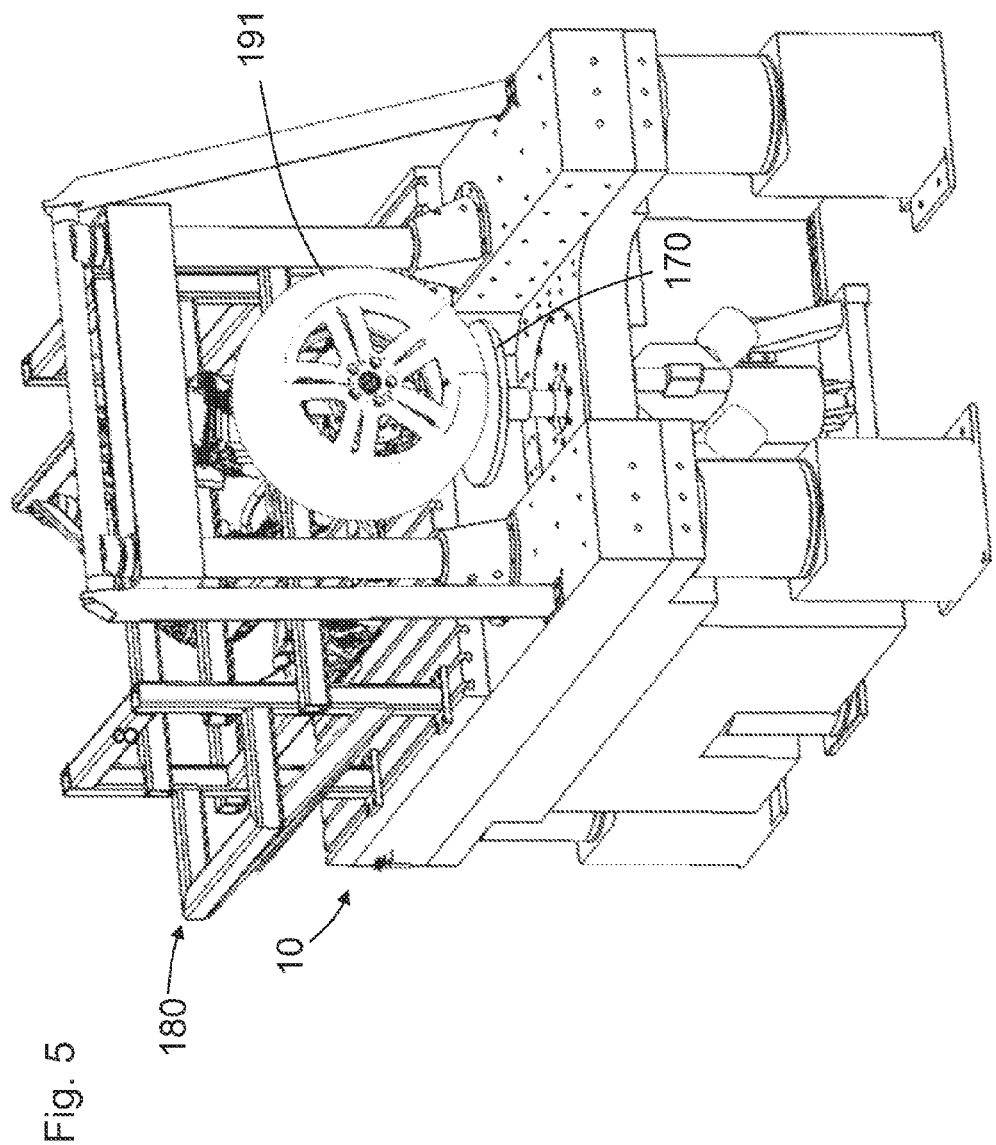
FIG. 5 shows a perspective view of the test stand according to FIG. 1 during the testing of a complete axle system, wherein the excitation of the axle system is carried out via a tire.

FIG. 5 shows a perspective view of the test stand according to FIG. 1 during the testing of the complete axle system 210 according to FIG. 4, wherein the excitation of the complete axle system 210 is carried out via a wheel 191. The construction of the test stand 10 according to FIG. 5 is substantially identical to the construction of the test stand 10 according to FIG. 4, wherein the connecting element 170 is simply formed in the style of a plate which interacts with the wheel 191 which is connected to the brake 190 of the complete axle system 210. The wheel 191 is stationary on the plate during the dynamic testing of the complete axle system 210.

Although the present invention was described based on preferred exemplary embodiments, it is not limited thereto but can be modified in various ways. In particular, the previously described developments and exemplary embodiments can be optionally combined with each other. It should also be pointed out that "a" does not exclude a multiplicity.

What is claimed is:

1. A test stand for dynamic testing of an individual running gear component or of a complete axle system of a motor vehicle, the test stand comprising:
 a test stand frame including a mounting area configured for mounting the complete axle system in the mounting area in a first installation direction;

a fastening device configured for fixed mounting of the individual running gear component on the fastening device in a second installation direction, the second installation direction being different from the first installation direction;

an actuator configured for dynamic excitation of both of the complete axle system and the individual running gear component, the actuator being configured to connect to the individual running gear component or the complete axle system in a region of a point of intersection of the first installation direction and the second installation direction; and a pneumatic spring suspension configured for vibration damping of the test stand frame, the pneumatic spring suspension including pneumatic springs having a natural frequency that is switchable between a first natural frequency and a second natural frequency.

2. The test stand recited in claim 1, wherein the fastening device is disposed adjacent to the mounting area.

3. The test stand recited in claim 1, wherein the fastening device is disposed substantially above the mounting area.

4. The test stand recited in claim 1, wherein the actuator is disposed adjacent to the mounting area and substantially below the fastening device.

5. The test stand recited in claim 1, wherein at least a section of the actuator, along a longitudinal direction of the actuator, is encompassed by the test stand frame.

6. The test stand recited in claim 1, wherein the actuator is configured to carry out excitation of both the individual running gear component and the complete axle system in a vertical direction.

7. The test stand recited in claim 1, wherein the actuator is configured to carry out excitation of both the individual running gear component and the complete axle system, the excitation having components that lie in a plane that is parallel to the mounting area.

8. The test stand recited in claim 1, wherein the actuator is configured to generate an excitation frequency of 0.001 Hz to 100 Hz.

9. The test stand recited in claim 1, wherein the fastening device includes a crosshead configured to connect to an end section of the individual running gear component.

10. The test stand recited in claim 9, wherein the crosshead is height adjustable with respect to the actuator.

11. The test stand recited in claim 9, wherein the crosshead has a natural frequency that is higher than a highest test frequency of the test stand.

12. The test stand recited in claim 11, wherein the actuator is a servo-hydraulic pulser.

13. A method for dynamic testing of an individual running gear or of a complete axle system on a test stand, the method comprising:

providing the test stand with a test stand frame having a mounting area configured for mounting the complete axle system, a fastening device configured for fixed mounting of the individual gear component on the fastening and an actuator configured for dynamic excitation of both of the complete axle system and the individual gear component;

providing the test stand with a pneumatic spring suspension configured for vibration damping of the test stand frame, the pneumatic spring suspension including pneumatic springs having a natural frequency that is switchable between a first natural frequency and a second natural frequency;

mounting one of:
the complete axle system on the mounting area of the test stand frame with the complete axle system disposed in the mounting area in a first installation direction, or
the individual running gear component, by a fixed mounting, to the fastening device with the individual running gear component disposed in a second installation direction, the second installation direction being different from the first installation direction; and dynamic exciting of the individual running gear component or of the complete axle system using the actuator, the actuator being connected to the individual running gear component or to the complete axle system in a region of a point of intersection of the first installation direction with the second installation direction.

14. The method for dynamic testing as recited in claim 13, further comprising:

establishing a test frequency for the dynamic testing of the individual running gear component or of the complete axle system;

determining whether the test frequency is substantially identical to a first natural frequency of pneumatic springs of a pneumatic spring suspension of the test stand or is substantially identical to a second natural frequency of the pneumatic springs; and establishing the second natural frequency for the pneumatic springs if the test frequency is substantially identical to the first natural frequency of the pneumatic springs and establishing the first natural frequency of the pneumatic springs if the test frequency is substantially identical to the second natural frequency of the pneumatic springs.

* * * * *